(12) United States Patent
Lin et al.

(10) Patent No.: US 11,708,123 B2
(45) Date of Patent: Jul. 25, 2023

(54) THREE-DIMENSIONAL FOLDING FRAME, ELECTRIC VEHICLE, BICYCLE, AND MOTORCYCLE

(71) Applicant: Feng Lin, Guangdong (CN)

(72) Inventors: Zijie Lin, Guangdong (CN); Feng Lin, Guangdong (CN); Fan Lu, Guangdong (CN)

(73) Assignee: Feng Lin, Guangdong (CN)

( * ) Notice: Subject to any disclaimer, the term of this patent is extended or adjusted under 35 U.S.C. 154(b) by 0 days.

(21) Appl. No.: 17/594,526

(22) PCT Filed: Nov. 29, 2019

(86) PCT No.: PCT/CN2019/121789
§ 371 (c)(1),
(2) Date: Oct. 20, 2021

(87) PCT Pub. No.: WO2021/097895
PCT Pub. Date: May 27, 2021

(65) Prior Publication Data
US 2022/0204116 A1    Jun. 30, 2022

(30) Foreign Application Priority Data
Nov. 18, 2019   (CN) .......................... 201911125882.3

(51) Int. Cl.
*B62K 15/00*   (2006.01)
(52) U.S. Cl.
CPC .................. *B62K 15/008* (2013.01)
(58) Field of Classification Search
CPC ..... B62K 15/00; B62K 15/006; B62K 15/008
(Continued)

(56) References Cited

U.S. PATENT DOCUMENTS 3,990,717 A * 11/1976 Best ..................... B62K 15/008
   280/278
7,681,900 B2 * 3/2010 Chang .................. B62K 15/006
   280/278
(Continued)

FOREIGN PATENT DOCUMENTS

CN    202320664 U    7/2012
CN    104417693 A    3/2015
(Continued)

OTHER PUBLICATIONS

International Search Report and Written Opinion in PCT/CN2019/121789 dated Aug. 18, 2020.

*Primary Examiner* — Anne Marie M Boehler
(74) *Attorney, Agent, or Firm* — Maschoff Brennan

(57) ABSTRACT

A three-dimensional folding frame is disclosed including a first pivot portion for providing a front folding wheel frame with movable folding; a second pivot portion for providing a rear folding wheel frame with movable folding; a third pivot portion for providing a handlebar vertical rod with rotatable folding; and a fourth pivot portion for providing a crossbar with rotatable folding. The crossbar includes a first folding arm and a second folding arm; the first folding arm is movably connected to the front folding wheel frame by means of the first pivot portion; the front folding wheel frame rotates about the first pivot portion and can move relative to the first folding arm; the second folding arm is movably connected to the rear folding wheel frame by means of the second pivot portion.

15 Claims, 9 Drawing Sheets

(58) Field of Classification Search
USPC .................................................. 280/278, 287
See application file for complete search history.

(56) References Cited

U.S. PATENT DOCUMENTS

| | | | | |
|---|---|---|---|---|
| 8,162,345 B1* | 4/2012 | Szu-Yao | .............. | B62K 15/008 |
| | | | | 280/278 |
| 8,894,084 B1* | 11/2014 | Yap | ...................... | B62K 15/008 |
| | | | | 280/278 |
| 2010/0025958 A1* | 2/2010 | Steenstra | ............. | B62K 15/006 |
| | | | | 280/281.1 |
| 2010/0230927 A1* | 9/2010 | Huang | .................. | B62K 15/008 |
| | | | | 280/278 |
| 2011/0109059 A1* | 5/2011 | Dumaresq | ................ | B62K 3/10 |
| | | | | 280/278 |
| 2015/0375820 A1* | 12/2015 | Banasky | .................. | B62M 6/60 |
| | | | | 280/287 |
| 2017/0066495 A1* | 3/2017 | Beistegui Chirapozu | ................... | |
| | | | | B62K 15/008 |
| 2019/0202520 A1 | 7/2019 | Yap | | |
| 2021/0380192 A1* | 12/2021 | Demond | .................. | B62M 9/00 |

FOREIGN PATENT DOCUMENTS

| | | | |
|---|---|---|---|
| CN | 106080907 | A | 11/2016 |
| CN | 106627930 | A | 5/2017 |
| CN | 108528601 | A | 9/2019 |
| WO | 2021097895 | A1 | 5/2021 |

* cited by examiner

THREE-DIMENSIONAL FOLDING FRAME, ELECTRIC VEHICLE, BICYCLE, AND MOTORCYCLE

CROSS-REFERENCE TO RELATED APPLICATIONS

This application is a national stage filing under 35 U.S.C. § 371 of international application number PCT/CN2019/121789, filed Nov. 29, 2019, which claims priority to Chinese patent application No. 201911125882.3 filed Nov. 18, 2019. The contents of these applications are incorporated herein by reference in their entirety.

TECHNICAL FIELD

The disclosure relates to a three-dimensional folding frame, an electric vehicle, a bicycle, and a motorcycle.

BACKGROUND

Conventional folding vehicles are less than ideal for today's consumers. For example, a folding mechanism of an existing folding vehicle, such as an electric vehicle, a bicycle, a motorcycle, a motor vehicle, etc. is difficult to use due to limited folding space and large occupied space. Only folding in a plane (i.e., in an X direction and a Y direction) is generally implemented and can also cause problems. Moreover, existing folding vehicles often have a complicated folding structure and a high manufacturing cost, and are not conducive to turnover and placement.

In order to overcome the above and other defects, the present disclosure provides a three-dimensional folding frame, an electric vehicle, a bicycle, and a motorcycle.

SUMMARY

A technical problem to be solved by the disclosure is to provide a three-dimensional folding frame, an electric vehicle, a bicycle, and a motorcycle, which can be subject to free three-dimensional folding and effectively compress a folding space, have a small storage volume, are an easy to realize mass manufacturing and use, and have a low manufacturing cost. After folding, most or all parts are in a compact and parallel state, just like all pivot portions are disassembled first and then the parts are put together.

In order to achieve the above objective, the technical solution in the disclosure is to provide a three-dimensional folding frame, which includes:

a first pivot portion for providing a front folding wheel frame with movable folding;

a second pivot portion for providing a rear folding wheel frame with movable folding;

a third pivot portion for providing a handlebar vertical rod with rotatable folding; and a fourth pivot portion for providing a crossbar with rotatable folding, where the crossbar includes a first folding arm and a second folding arm; the first folding arm is movably connected to the front folding wheel frame by means of the first pivot portion, and the front folding wheel frame is rotatable about the first pivot portion and is movable relative to the first folding arm to form a three-dimensional movement freely folded state;

the second folding arm is movably connected to the rear folding wheel frame by means of the second pivot portion; the rear folding wheel frame is rotatable about the second pivot portion and is movable relative to the second folding arm to form a three-dimensional movement freely folded state; and the first folding arm and the second folding arm are switchable between a folded state and an unfolded state by means of rotation of the fourth pivot portion.

In one or more embodiments of the disclosure, the front folding wheel frame is connected to a handlebar vertical rod holder, the handlebar vertical rod holder is connected to the front folding wheel frame by means of the third pivot portion to perform three-dimensional folding on the handlebar vertical rod, and the handlebar vertical rod holder is rotatable in a Z direction while rotating in X and Y directions.

In one or more embodiments of the disclosure, the first folding arm is foldable with respect to the front folding wheel frame, the second folding arm is foldable with respect to the rear folding wheel frame, and according to different states required, the crossbar is rotatably foldable with respect to the front folding wheel frame and the rear folding wheel frame in planar motion.

In one or more embodiments of the disclosure, both the front folding wheel frame and the rear folding wheel frame are engaged with the crossbar by using a cone surface and a quick detachable structure, such as a quick-release structure, so as to realize quick and accurate alignment and automatic locking, and avoid shaking during driving.

Under the same conception, the disclosure further provides a three-dimensional folding frame, which includes:

a folding wheel frame including a front folding wheel frame and a rear folding wheel frame;

a front wheel connected to the front folding wheel frame;

a rear wheel connected to the rear folding wheel frame;

where the front folding wheel frame is foldable at different functional positions at a front end of a crossbar by means of a three-dimensional movement of a first pivot portion, and the rear folding wheel frame is foldable at different functional positions at a rear end of the crossbar by means of a three-dimensional movement of the second pivot portion; the first pivot portion and the second pivot portion are capable of performing a translational movement while rotating;

the crossbar includes a first folding arm and a second folding arm; the first folding arm and the second folding arm are switchable between a folded state and an unfolded state by means of the rotation of a fourth pivot portion;

a handlebar vertical rod holder is connected to the front folding wheel frame by means of the third pivot portion to perform three-dimensional folding on a handlebar vertical rod, and the handlebar vertical rod holder is rotatable in a Z direction while rotating in X and Y directions;

a folding form that the crossbar is foldable with respect to the front folding wheel frame and the rear folding wheel frame is implemented; three-dimensional folding of the crossbar with respect to the folding wheel frame which are capable of rotating and translating at the same time is implemented; and three-dimensional folding of the handlebar vertical rod with respect to the front folding wheel frame which rotate in X, Y and Z directions at the same time is implemented.

In one or more embodiments of the disclosure, the folding wheel frame is provided with a supporting shaft, the crossbar is movably engaged with the supporting shaft, and the folding wheel frame is movable on a Z axis until a storage volume is minimum when the first folding arm is folded to the second folding arm.

In one or more embodiments of the disclosure, the second folding arm is provided with a hinge holder, and the hinge holder is connected to a saddle rod so that the saddle rod is foldable close to the second folding arm; and the saddle rod and a saddle holder are foldable relative to the saddle rod by means of a hinged locking portion.

The disclosure further provides an electric vehicle including the three-dimensional folding frame in the solution above.

The disclosure further provides a bicycle including the three-dimensional folding frame in the solution above.

The disclosure further provides a motorcycle including the three-dimensional folding frame in the solution above.

Compared with the prior approaches, the disclosure provides at least the following beneficial effects.

Due to adoption of the solution above, the disclosure has a reasonable structure, can be subject to three-dimensional folding and effectively compress a folding space, has a small storage volume, is easy to realize mass manufacturing and use, and has a low manufacturing cost; and after folding, all parts are in a compact and parallel state, just like all pivot portions are disassembled first and then the parts are put together. According to different states required, optionally, the crossbar may only be rotatably folded with the front folding wheel frame and the rear folding wheel frame in planar motion.

DETAILED DESCRIPTION

Figure 1:
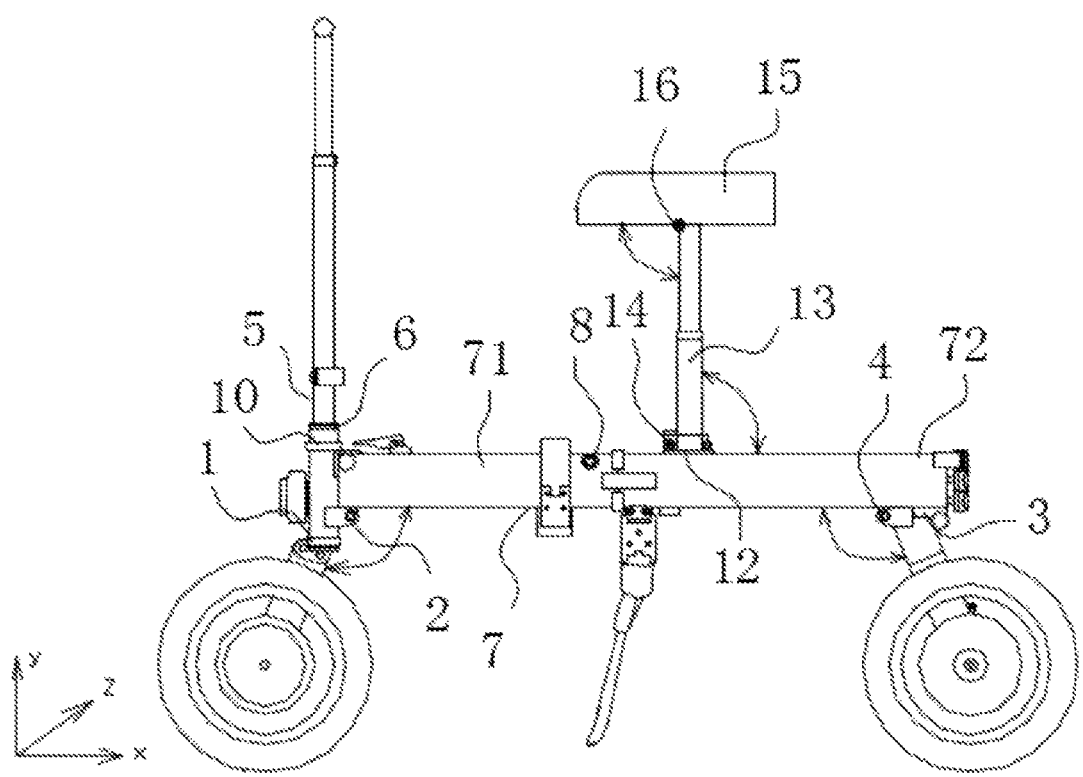
FIG. 1 is a schematic structural diagram of a structure of a three-dimensional folding frame in an embodiment of the disclosure.

The embodiments of the disclosure will be described in detail hereinafter. Examples of the embodiments are shown in the accompanying drawings. The same or similar reference numerals throughout the drawings denote the same or similar elements or elements having the same or similar functions.

The orientations shown in the accompanying drawings cannot be understood as limiting the specific scope of protection of the disclosure, and are only used for the reference understanding of the preferred embodiments, and the product parts shown in the accompanying drawings can be changed in position or increased in number or simplified in structure.

The "connection" described in the specification and the "connection" relationship between the parts shown in the accompanying drawings can be understood as fixed connection or detachable connection or integral connection, and can also be direct connection or connection through an intermediate medium. Those of ordinary skills in the art can understand the connection relationship according to the specific situation and substitute different embodiments in a suitable way. In the orientations shown in the accompanying drawings, the parts can be directly contacted or contacted through other features between the parts. For example, the term "above" may refer to "directly above" and "obliquely above", or only refer to being higher than other objects. Other orientations can also be understood by analogy.

The embodiments of the disclosure are further described hereinafter with reference to the accompanying drawings of the specification, so that the technical solutions and beneficial effects of the disclosure are clearer and more definite; and the description is intended to explain the disclosure and shall not be understood as limiting the disclosure.

Figure 2:
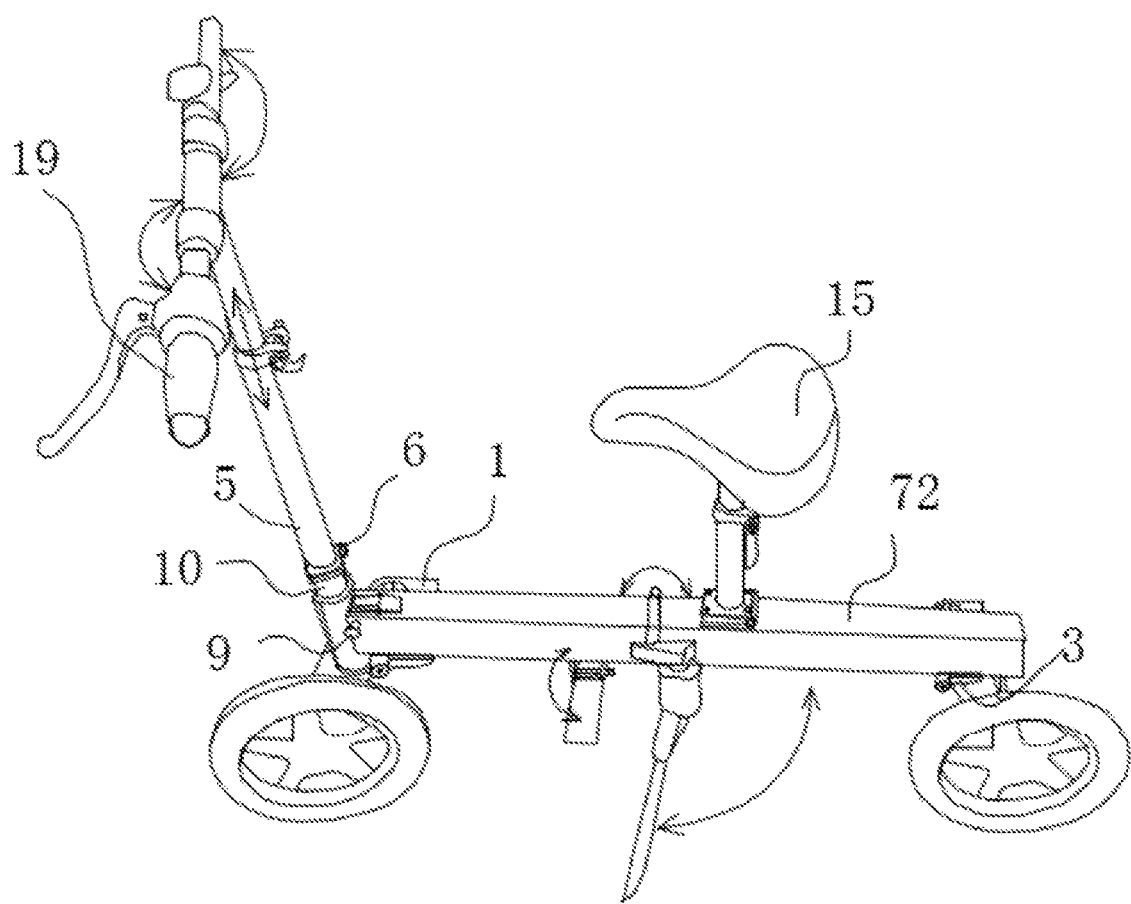
FIG. 2 is a schematic diagram of a stereoscopic structure of the three-dimensional folding frame in the embodiment of the disclosure.
Figure 3:
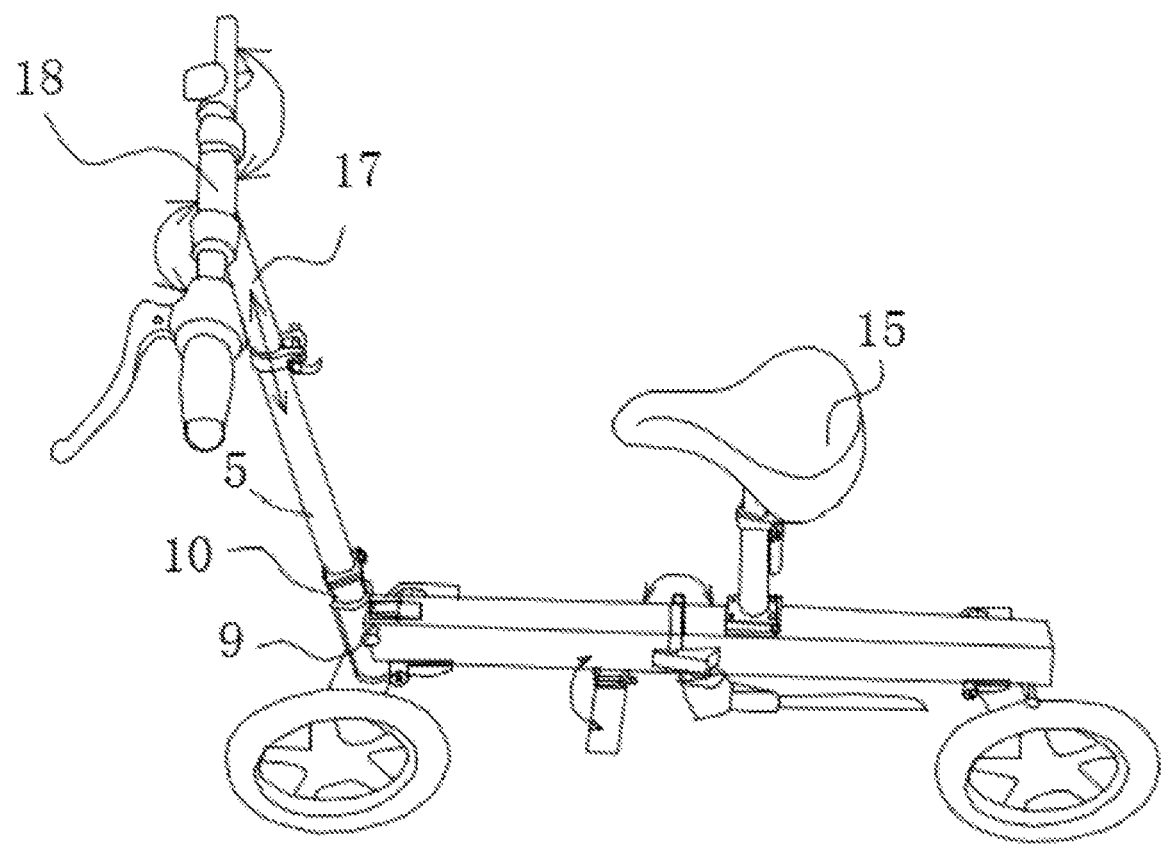
FIG. 3 is a schematic diagram of the stereoscopic structure of the three-dimensional folding frame in the embodiment of the disclosure in another state.
Figure 4:
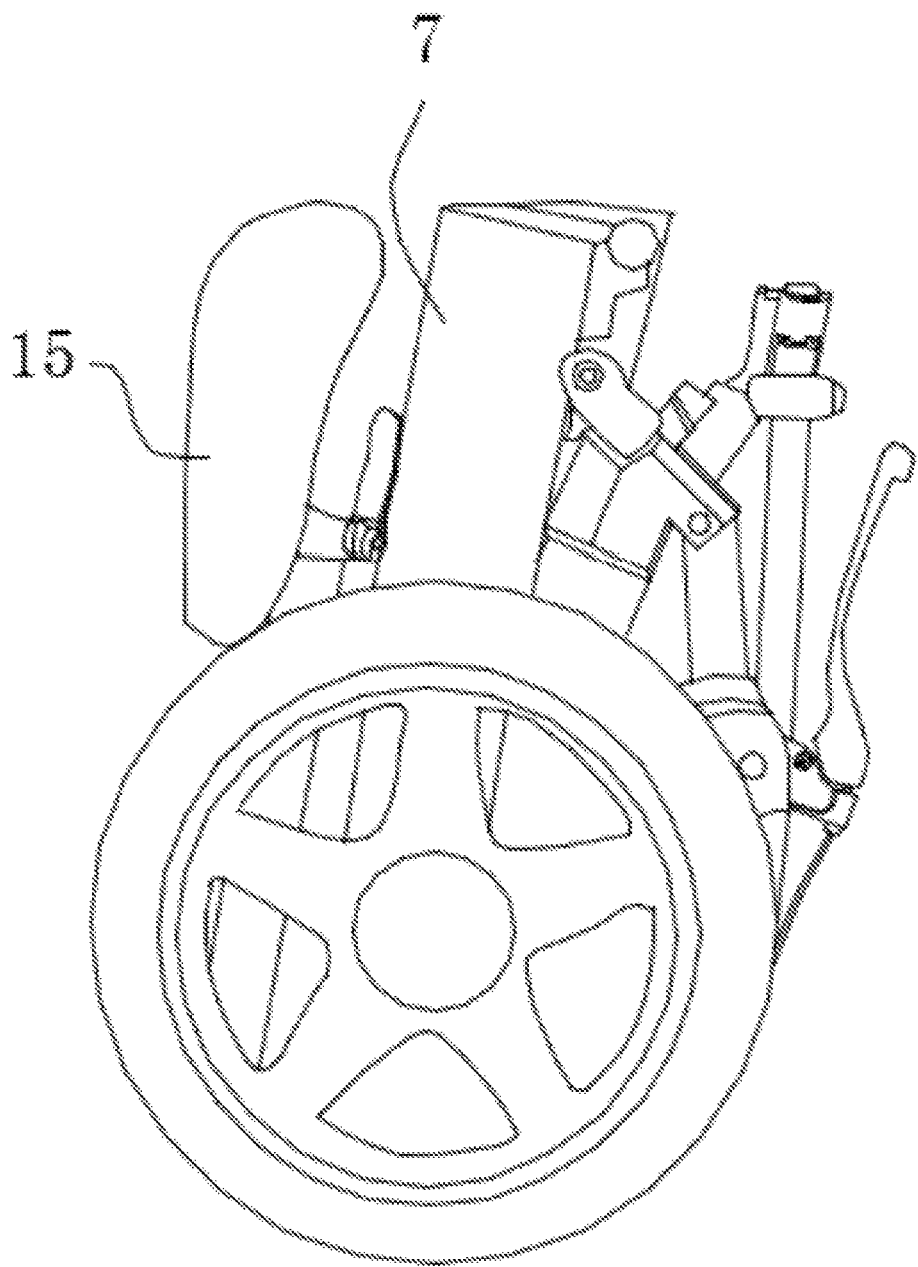
FIG. 4 is a schematic diagram of a storage structure of the three-dimensional folding frame in the embodiment of the disclosure.
Figure 5:
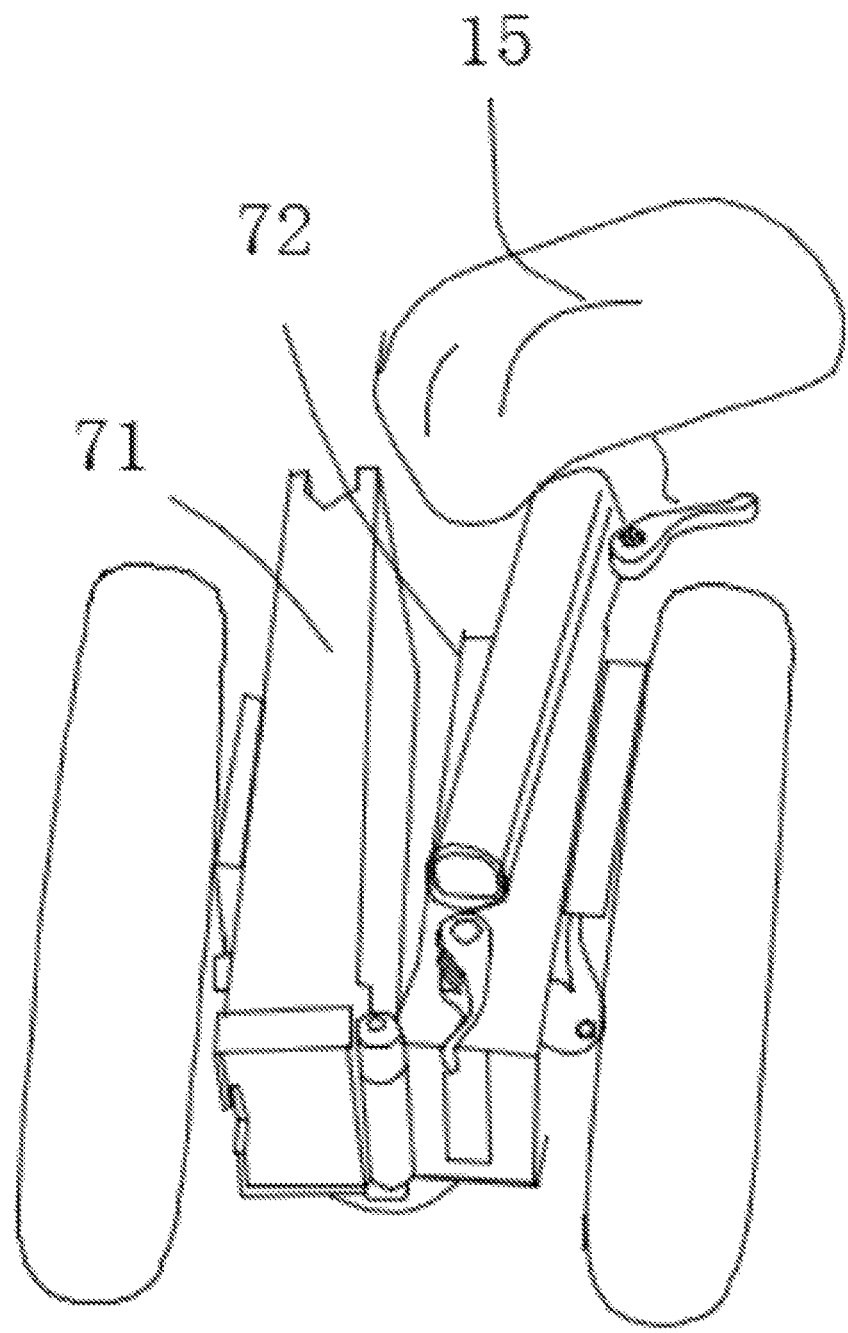
FIG. 5 is a schematic diagram of the storage structure of the three-dimensional folding frame in the embodiment of the disclosure in another view.
Figure 6:
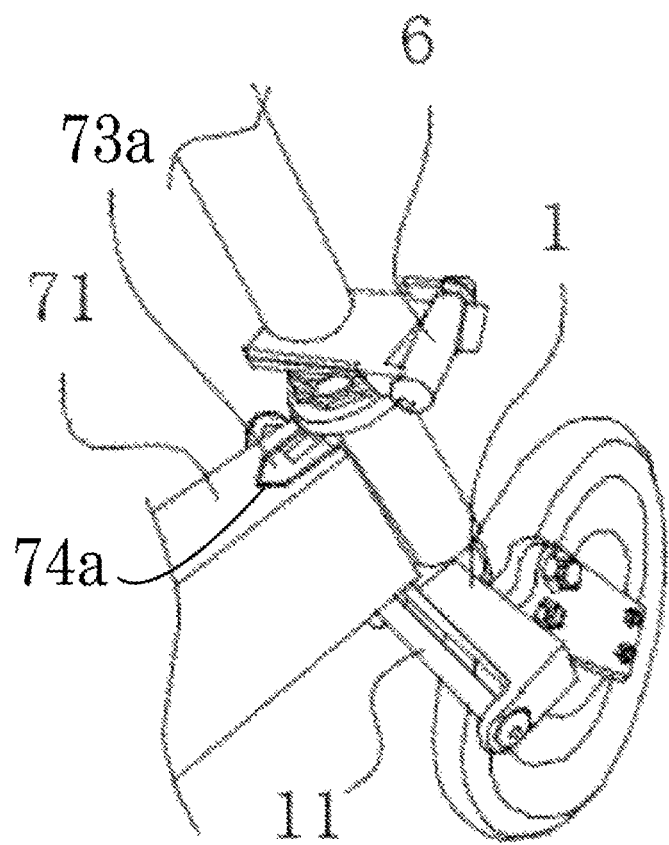
FIG. 6 is a schematic diagram of a combined structure of a front folding wheel frame, a first folding arm, a pivot portion and a front vertical rod in the embodiment of the disclosure.
Figure 7:
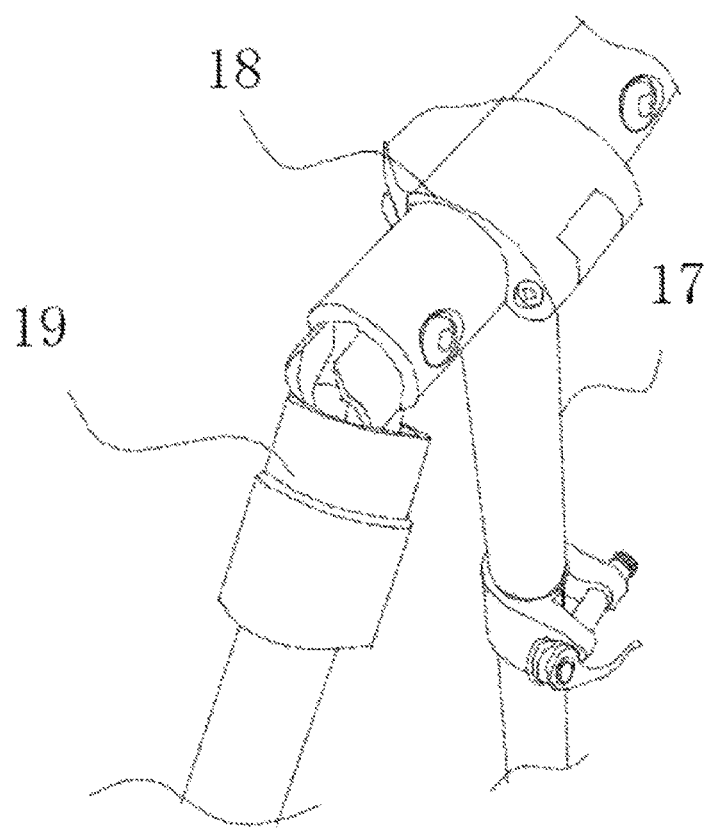
FIG. 7 is a schematic diagram of a handle in a folded state in the embodiment of the disclosure.
Figure 8:
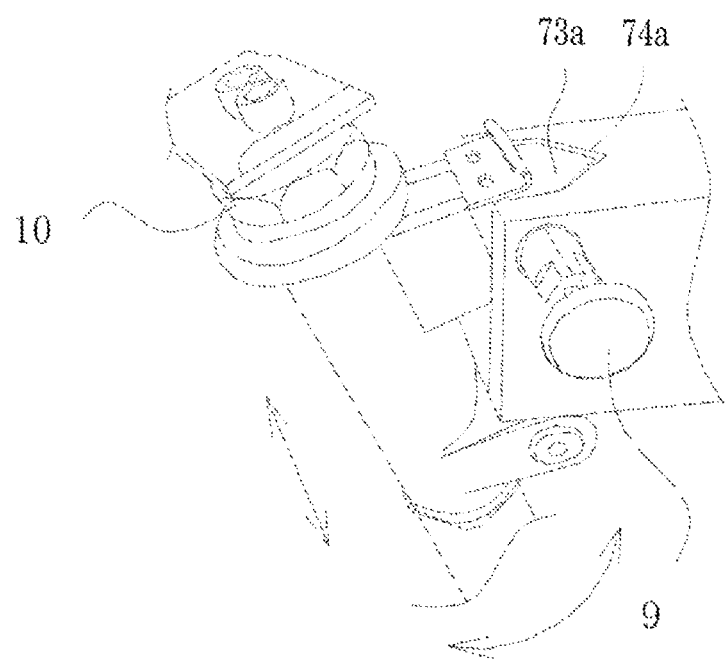
FIG. 8 is a schematic diagram of combined and folded front folding wheel frame, first folding arm, pivot portion and front vertical rod in a state in the embodiment of the disclosure.
Figure 9:
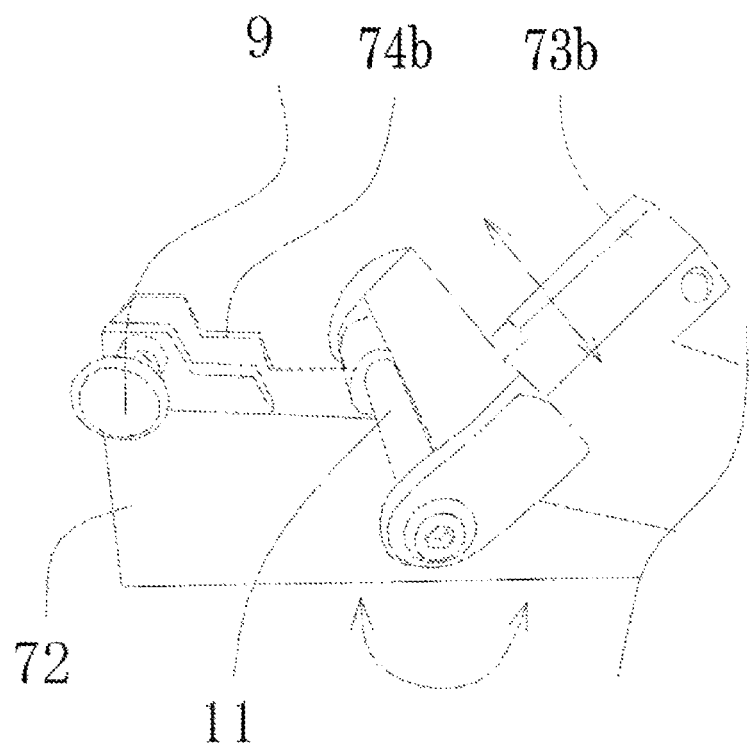
FIG. 9 is a schematic diagram of a structure of a rear folding wheel frame and a second folding arm in a rotatably separated state in the embodiment of the disclosure.

As shown in FIG. 1 to FIG. 9, a three-dimensional folding frame is provided according to an embodiment of the disclosure, which includes: a first pivot portion 2 for providing a front folding wheel frame 1 with movable folding; a second pivot portion 4 for providing a rear folding wheel frame 3 with movable folding; a third pivot portion 6 for providing a handlebar vertical rod 5 with rotatable folding; and a fourth pivot portion 8 for providing a crossbar 7 with rotatable folding. The crossbar 7 includes a first folding arm 71 and a second folding arm 72. The first folding arm 71 is movably connected to the front folding wheel frame 1 by means of the first pivot portion 2, and the front folding wheel frame 1 is rotatable about the first pivot portion 2 and movable relative to the first folding arm 71 to form a three-dimensional movement freely folded state.

The second folding arm 72 is movably connected to the rear folding wheel frame 3 by means of the second pivot portion 4. The rear folding wheel frame 3 is rotatable about the second pivot portion 4 and movable relative to the second folding arm 72 to form a three-dimensional movement freely folded state. The first folding arm 71 and the second folding arm 72 may switch between a folded state and an unfolded state by means of the rotation of the fourth pivot portion 8.

The front folding wheel frame 1 is engaged with the first folding arm 71 by using a first block 73a that interfaces with a first groove 74a and a quick detachable structure 9, and the rear folding wheel frame 3 is engaged with the second folding arm 72 by using a second block 73b that interfaces with a second groove 74b and a quick detachable structure 9, so as to realize quick and accurate alignment and automatic locking, and avoid shaking during driving.

The first folding arm 71 is foldable with respect to the front folding wheel frame 1, the second folding arm 72 is foldable with respect to the rear folding wheel frame 3, and according to different states required, the crossbar 7 is rotatably foldable with respect to the front folding wheel frame 1 and the rear folding wheel frame 3 in planar motion.

The front folding wheel frame 1 is engaged with the first folding arm 71 by using a cone surface 73 and a quick detachable structure 9, and the rear folding wheel frame 3 is engaged with the second folding arm 72 by using a cone surface 74 and a quick detachable structure 9, so as to realize quick and accurate alignment and automatic locking, and avoid shaking during driving.

Further, the front folding wheel frame 1 may be folded at different functional positions at a front end of the crossbar 7 by means of three-dimensional movement of the first pivot portion 2, and the rear folding wheel frame 3 may be folded at different functional positions at a rear end of the crossbar by means of three-dimensional movement of the second pivot portion 4. The first pivot portion 2 and the second pivot portion 4 are capable of performing a translational movement while rotating.

The handlebar vertical rod holder 10 is connected to the front folding wheel frame 1 by means of the third pivot portion 6 to perform three-dimensional folding on the handlebar vertical rod 5, and the handlebar vertical rod holder 10 may rotate in a Z direction while rotating in X and Y directions. An inclined shaft is employed in the third pivot portion 6 to prevent the handlebar vertical rod 5 from colliding with the crossbar 7 when the handlebar vertical rod 5 is tilted and folded downwardly.

A folding form that the crossbar 7 is foldable with respect to the front folding wheel frame 1 and the rear folding wheel frame 3 is implemented, three-dimensional folding of the crossbar 7 with respect to the folding wheel frame which are capable of rotating and translating at the same time is implemented, and three-dimensional folding of the handlebar vertical rod 5 with respect to the front folding wheel frame which rotate in X, Y and Z directions at the same time is implemented. The folding wheel frame is provided with a supporting shaft 11, the crossbar 7 is movably engaged with the supporting shaft 11, and the folding wheel frame may move on a Z axis until a storage volume is minimum when the first folding arm 71 is folded to the second folding arm 72.

The second folding arm 72 is provided with a hinge holder 12, and the hinge holder 12 is connected to a saddle rod 13 so that the saddle rod 13 is folded close to the second folding arm 72. The hinge holder and the saddle rod may be movably connected to be folded by using a fifth pivot portion 14. A saddle holder 15 is folded relative to the saddle rod 13 by means of a hinged locking portion 16.

A telescopic rod 17 is connected above the handlebar vertical rod 5, the telescopic rod 17 is connected to a handle supporting portion 18, and the handle supporting portion 18 and the handle are folded by means of a hinged sleeve structure 19.

In combination with the description above and all accompanying drawings, the three-dimensional folding frame provided by the disclosure may be applied to an electric vehicle, a bicycle, a motorcycle, a motor vehicle, etc., or other vehicles or devices including the three-dimensional folding frame of the solution above, so that the vehicles have a reasonable structure, may be subject to three-dimensional folding and effectively compress a folding space, have a small storage volume, are easy to realize mass manufacturing and use, and have a low manufacturing cost. After folding, all parts are in a compact and parallel state, just like all pivot portions are disassembled first and then the parts are put together. According to different states required, the crossbar may only be rotatably folded with the front folding wheel frame and the rear folding wheel frame in planar motion.

The disclosure is described in terms of the above embodiments, but there may still be alterations, replacements and equivalent solutions falling within the scope of the disclosure. There are also many alternative ways to implement the disclosure. Therefore, it is intended to interpret the appended claims as including all such alterations, replacements and equivalent solutions falling within the gist and scope of the disclosure. It shall be understood by those of ordinary skills in the art that the disclosure is not limited to the above embodiments, and the improvements and substitutions by the technologies commonly known in the art based on the disclosure all fall within the scope of protection of the disclosure, which shall be defined by the claims.

The invention claimed is:

1. A three-dimensional folding frame, comprising:
a first pivot portion for providing a front folding wheel frame with movable folding;
a second pivot portion for providing a rear folding wheel frame with movable folding;
a third pivot portion for providing a handlebar vertical rod with rotatable folding; and
a fourth pivot portion for providing a crossbar with rotatable folding, wherein the crossbar comprises a first folding arm and a second folding arm; the first folding arm is movably connected to the front folding wheel frame by means of the first pivot portion, and the front folding wheel frame is rotatable about the first pivot portion and is movable relative to the first folding arm to form a first three-dimensional movement freely foldable state;
wherein the second folding arm is movably connected to the rear folding wheel frame by means of the second pivot portion; the rear folding wheel frame is rotatable about the second pivot portion and is movable relative to the second folding arm to form a second three-dimensional movement freely foldable state;
wherein the first folding arm and the second folding arm are switchable between a folded state and an unfolded state by means of rotation of the fourth pivot portion; and
each of the front folding wheel frame and the rear folding wheel frame is provided with a supporting shaft, the crossbar is movably engaged with the supporting shafts, the front folding wheel frame and the rear folding wheel frame are movable on a Z axis until a storage volume is minimum when the first folding arm is folded to the second folding arm.

2. The three-dimensional folding frame according to claim 1, wherein the front folding wheel frame is connected to a handlebar vertical rod holder, the handlebar vertical rod holder is connected to the front folding wheel frame by means of the third pivot portion to perform three-dimensional folding on the handlebar vertical rod, and the handlebar vertical rod holder is rotatable in a Z direction while rotating in X and Y directions.

3. The three-dimensional folding frame according to claim 1, wherein the front folding wheel frame is engaged with the crossbar by using a first block that interfaces with a first groove and a quick detachable structure, the rear folding wheel frame is engaged with the crossbar by using a second block that interfaces with a second groove and a quick detachable structure, so as to realize quick and accurate alignment and automatic locking, and avoid shaking during driving.

4. An electric vehicle, comprising the three-dimensional folding frame according to claim 1.

5. The electric vehicle of claim 4, wherein the front folding wheel frame is connected to a handlebar vertical rod holder, the handlebar vertical rod holder is connected to the front folding wheel frame by means of the third pivot portion to perform three-dimensional folding on the handlebar vertical rod, and the handlebar vertical rod holder is rotatable in a Z direction while rotating in X and Y directions.

6. A bicycle, comprising the three-dimensional folding frame according to claim 1.

7. The bicycle of claim 6, wherein the front folding wheel frame is connected to a handlebar vertical rod holder, the handlebar vertical rod holder is connected to the front folding wheel frame by means of the third pivot portion to perform three-dimensional folding on the handlebar vertical rod, and the handlebar vertical rod holder is rotatable in a Z direction while rotating in X and Y directions.

8. A motorcycle, comprising the three-dimensional folding frame according to claim 1.

9. The motorcycle of claim 8, wherein the front folding wheel frame is connected to a handlebar vertical rod holder, the handlebar vertical rod holder is connected to the front folding wheel frame by means of the third pivot portion to perform three-dimensional folding on the handlebar vertical rod, and the handlebar vertical rod holder is rotatable in a Z direction while rotating in X and Y directions.

10. A three-dimensional folding frame, comprising:
a folding wheel frame comprising a front folding wheel frame and a rear folding wheel frame;
a front wheel connected to the front folding wheel frame;
a rear wheel connected to the rear folding wheel frame;
wherein the front folding wheel frame is foldable at different functional positions at a front end of a crossbar by means of a first three-dimensional movement of a first pivot portion, and the rear folding wheel frame is foldable at different functional positions at a rear end of the crossbar by means of a second three-dimensional movement of a second pivot portion; the first pivot portion and the second pivot portion are capable of performing a translational movement while rotating;
the crossbar comprises a first folding arm and a second folding arm; the first folding arm and the second folding arm are switchable between a folded state and an unfolded state by means of rotation of a fourth pivot portion;
a handlebar vertical rod holder is connected to the front folding wheel frame by means of a third pivot portion to perform three-dimensional folding on a handlebar vertical rod, and the handlebar vertical rod holder is rotatable in a Z direction while rotating in X and Y directions;

wherein a folding form of the three-dimensional folding frame includes that the crossbar is foldable with respect to the front folding wheel frame and the rear folding wheel frame; three-dimensional folding of the crossbar with respect to the front and the rear folding wheel frame are capable of rotating and translating at the same time; and three-dimensional folding of the handlebar vertical rod with respect to the front folding wheel frame is rotatable in X, Y and Z directions at the same time;

each of the front folding wheel frame and the rear folding wheel frame are provided with a supporting shaft, the crossbar is movably engaged with the supporting shafts, and the front folding wheel frame and the rear folding wheel frame are movable on a Z axis until a storage volume is minimum when the first folding arm is folded to the second folding arm.

11. The three-dimensional folding frame according to claim 10, wherein the second folding arm is provided with a hinge holder, and the hinge holder is connected to a saddle rod so that the saddle rod is foldable close to the second folding arm; and a saddle holder is foldable relative to the saddle rod by means of a hinged locking portion.

12. An electric vehicle, comprising the three-dimensional folding frame according to claim 10.

13. A bicycle, comprising the three-dimensional folding frame according to claim 10.

14. A motorcycle, comprising the three-dimensional folding frame according to claim 10.

15. The motorcycle of claim 14, wherein the second folding arm is provided with a hinge holder, and the hinge holder is connected to a saddle rod so that the saddle rod is foldable close to the second folding arm; and a saddle holder is foldable relative to the saddle rod by means of a hinged locking portion.

\* \* \* \* \*